3,038,013
COLOR IMPROVEMENT IN SYNTHESIS OF POLYSULFIDES

Paul F. Warner, Phillips, Tex., assignor to Phillips Petroleum Company, a corporation of Delaware
No Drawing. Filed Aug. 25, 1959, Ser. No. 835,832
11 Claims. (Cl. 260—608)

This invention relates to the preparation of organic sulfides. In one aspect, it relates to the preparation of organic polysulfides by reacting mercaptans with sulfur in the presence of a catalyst and a color inhibitor. In another aspect, it relates to the preparation of dialkyl polysulfides by reacting alkyl mercaptans with sulfur in the presence of a catalyst and a finely divided metal. In another aspect, it relates to the preparation of dialkyl polysulfides by reacting alkyl mercaptans with sulfur in the presence of a catalytic amount of lime and a color inhibitor comprising a finely divided metal. In another aspect, it relates to the preparation of dialkyl polysulfides by reacting alkyl mercaptains with sulfur in the presence of a catalytic amount of phosphorus pentasulfide and a color inhibitor comprising a finely divided metal.

Organic polysulfides, and particularly dialkyl polysulfides, have been found useful for many purposes such as additives for elastomers, anti-oxidants for lubricating oils, intermediates for the production of valuable organic chemicals, insecticides, germicides, and additives to diesel fuels to improve the number and the ignition qualities of these fuels. These compounds have also been found useful in the compound of extreme pressure lubricants and in the acceleration of rubber treating processes.

It has been previously disclosed that aliphatic polysulfides in general may be synthesized by reacting sulfur with a mercaptan in the present of metal hydroxides. However, in the synthesesis of these materials in this manner the products were so dark in color that they were not suitable for use for some of their intended purposes. For example, the products were too dark to be desirable for use as insecticides.

It is an object of this invention to provide an improved process for the preparation of organic polysulfides by the reaction of organic mercaptans with sulfur. It is another object of this invention to provide organic polysulfides having an improved, more desirable color. It is another object of this invention to provide a color inhibitor for use in synthesizing organic polysulfides.

Other aspects, objects, and the several advantages are apparent from a study of this disclosure and the appended claims.

Thus, according to the present invention, there is provided an improved process for the preparation of organic sulfides from the reaction of mercaptans with sulfur using a basic catalyst and a color inhibitor. Also according to this invention, there is provided a process for the preparation of dialkyl polysulfides from alkyl mercaptans and sulfur in the presence of a catalytic amount of lime, using finely divided metal particles as a color inhibitor. Also according to this invention, there is provided a process for the preparation of dialkyl polysulfides from alkyl mercaptans and sulfur in the presence of a catalytic amount of phosphorus pentasulfide using finely divided metal particles as a color inhibitor. Also according to this invention, there is provided a process for the preparation of ditertiarydodecyl trisulfide and dietertiarydodecyl tetrasulfide by reacting tertiarydodecyl mercaptan with sulfur in the present of a catalytic amount of lime and a color inhibitor comprising water and a finely divided metal selected from the group consisting of iron, aluminum and zinc. Also according to the invention, there is provided a process for the preparation of ditertiarydodecyl trisulfide and ditertiarydodecyl tetrasulfide by reacting tertiarydodecyl mercaptan with sulfur in the presence of a catalytic amount of phosphorus pentasulfide and a color inhibitor comprising water and a finely divided metal selected from the group consisting of iron, aluminum and zinc. Also according to this invention, there is provided tertiarydodecyl tri- and tetrasulfides having improved color characteristics, prepared from the reaction of tertiarydodecyl mercaptan in the presence of a catalylst, using finely divided metal particles and water to inhibit color formation.

In the synthesis of ditertiarydodecyl tri- and tetrasulfides from alkyl-mercaptans and sulfur, hydrated lime has been found to be a desirable catalyst. Among the advantages of using lime as the catalyst are included (1) rapid reaction rates at relatively low temperatures, for example between 200 and 250° F. and (2) relatively slow rates of decomposition of the mercaptan and the product at reaction temperatures. Equations illlustrating the manufacture of the tri- and tetrasulfides are as follows:

$$2C_{12}H_{25}SH + 2S \quad C_{12}H_{25}S_3C_{12}H_{25} + H_2S$$
$$2C_{12}H_{25}SH + 3S \quad C_{12}H_{25}S_4C_{12}H_{25} + H_2S$$

In runs made to produce ditertiarydodecyl tri- and tetrasulfides by reacting mercaptans with sulfur in the presence of lime as the catalyst, each run producing approximately 50 to 100 gallons of product, for use in the pesticide market, the products were so dark in color that they were not suitable for their intended purpose. The color of these tri- and tetrasulfides was in the range of 18+ Gardner. The runs were made in a stainless steel reactor which was cleaned prior to use.

I have found that, in the preparation of organic polysulfides from mercaptans and sulfur, the addition of a small amount of metal dust, for example, iron, aluminum, or zinc, and water to the reaction mixture very markedly inhibits the color formation. Other metal dusts may also be used, a particular metal being chosen for its effectiveness in inhibiting the color formation when using specific mercaptans.

Standard charges for laboratory runs illustrating this invention, using lime as a catalyst, were as follows:

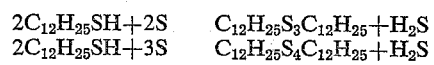

|  | Trisulfide | | Tetrasulfide | |
| --- | --- | --- | --- | --- |
|  | grams | mols | grams | mols |
| $C_{12}SH$ | 200 | 1 | 200 | 1 |
| Sulfur | 32 | 1 | 48 | 1.5 |
| $Ca(OH)_2$ | 10 | 0.13 | 10 | 0.13 |

The reactions were carried out in a 600 ml. beaker equipped with a motor driven stirrer. The temperature was accurately controlled through the use of an automatic temperature controller. The following examples illustrate the invention.

Example I

Two hundred grams of tertiarydodecyl mercaptan, 32 grams of sulfur and 10 grams of calcium hydroxide were placed in a beaker and stirred continuously while maintaining the temperature at 300° F., thus forming ditertiarydodecyl trisulfide. The Gardner color developed as follows:

Hours: Gardner color
0.5 _____ 5
1.0 _____ 5
2.0 _____ 7
4.0 _____ 11

Example II

A reaction as described in Example I was duplicated except that 1 gram of aluminum dust and 1 gram of water were added to the reaction mixture. The results of the color tests follow:

| Hours: | Gardner color |
|---|---|
| 0.5 | 4 |
| 1.0 | 5 |
| 2.0 | 6 |
| 4.0 | 8 |

The aluminum powder used in this example was Baker's Purified Grade, a flaky material similar to that used in aluminum paints.

Example III

The reaction of Example I was duplicated except that 1 gram of zinc dust and 1 gram of water were added to the reaction mixture.

| Hours: | Gardner color |
|---|---|
| 0.5 | 4 |
| 1.0 | 4 |
| 2.0 | 5 |
| 4.0 | 5 |

The zinc dust used in this example was Mallinkrodt's Analytical Reagent Grade, assay 95+ percent zinc.

Example IV

Two hundred grams of tertiarydodecyl mercaptan, 48 grams of sulfur, and 10 grams of calcium hydroxide were mixed in a beaker and stirred continuously while maintaining the temperature at 300° F., thus forming di-tertiarydodecyl tetrasulfide. The color tests were as follow:

| Hours: | Gardner color |
|---|---|
| 0.5 | 8 |
| 1.0 | 9 |
| 2.0 | 10 |
| 3.0 | 11 |
| 4.0 | — |

Example V

The reaction described in Example IV was duplicated except that 1 gram of iron dust was added to the reaction mixture. The results of the color tests follows:

| Hours: | Gardner color |
|---|---|
| 0.5 | 7 |
| 1.0 | 9 |
| 2.0 | 12 |
| 3.0 | — |
| 4.0 | 15 |

The iron dust used in this and the following examples was Baker's Analyzed Low Nitrogen Grade.

Example VI

The reaction described in Example IV was duplicated except that 1 gram of iron dust and 1 gram of water were added to the reaction mixture. The results of the color tests follow:

| Hours: | Gardner color |
|---|---|
| 0.5 | 6 |
| 1.0 | 6 |
| 2.0 | 7 |
| 3.0 | — |
| 4.0 | 7 |

As noted, all of the above six examples are made using a lime catalyst. To illustrate the application of the invention to the reaction using phosphorus pentasulfide as a catalyst, the runs of Examples VII and VIII were made.

Example VII

Two-hundred grams of tertiarydodecyl mercaptan, 32 grams of sulfur, and 1.2 grams of phosphorus pentasulfide were placed in a beaker and stirred continuously while maintaining the temperature at 300° F., thus forming di-tertiarydodecyl trisulfide. The results of the color tests were:

| Hours: | Gardner color |
|---|---|
| 1.0 | 13 |
| 2.0 | 15 |
| 3.0 | 16 |
| 4.0 | 18 |

Example VIII

The reaction described in Example VII was duplicated except that 1.0 gram of iron dust was added to the mixture. The results of the color tests were:

| Hours: | Gardner color |
|---|---|
| 1.0 | 6 |
| 2.0 | 8 |
| 3.0 | 10 |
| 4.0 | 14 |

Example IX

The following data, taken from a run to produce di-tertiarydodecyl tetrasulfide illustrate the effect of the temperature on the reaction using lime as a catalyst and methanol as a promoter for the reaction.

|  | Pounds | Mols |
|---|---|---|
| Charge: |  |  |
| Tertiarydodecyl mercaptan | 7.14 | 0.0357 |
| Sulfur | 1.70 | 0.0531 |
| Calcium hydroxide | 0.09 |  |
| Methanol | 0.09 |  |

CONDITIONS

| Time, Min. | Temperature, ° F. | Mercaptan Sulfur Wt. Percent (1) | Remarks |
|---|---|---|---|
| 0 | 80 | 15.0 |  |
| 15 | 150 |  | H$_2$S Started Coming Off. |
| 20 | 170 |  | Shut off Heat to control reaction rate. |
| 125 | 180 | 7.0 | Most H$_2$S liberated. |
| 155 | 250 | 1.94 |  |
| 215 | 300 | 0.98 | Shut down. |

Product Recovered _____ 7.814 lbs.

Properties of product:
  Refractive index 20/D _____ 1.5243
  Specific gravity 20/4 _____ 0.9680
  Total sulfur _____ 25.5
  Color, Gardner _____ 6
  Distillation [2] _____ F at 760
    IBP _____ 400
    5 _____ 447
    10 _____ 478
    50 _____ 590
    60 (decomposed at 310° F.) _____ ____

[1] Ran on the liquid phase only.
[2] Ran at 5 mm. Hg, corrected to 760 mm. Hg.

The reaction was progressing nicely at 180° F. After two hours, however, approximately half the mercaptan remained unconverted. The temperature was raised to 300° F. and the reaction was substantially complete in an hour.

Using lime as a catalyst, the process operates successfully between about 100° and 350° F. Since the reaction proceeds slowly at 150° F. with some decomposition of the polysulfide at or near 350° F., the preferred range for the reaction is 200° to 300° F.

For the reaction using phosphorus pentasulfide as the catalyst, a temperature within the range of 200° F. to 400° F. can be employed in most instances, but temperatures within the range of 250° F. to 350° F. are generally preferred.

The invention is applicable to the reaction of mercaptans having lower and higher molecular weights than the tertiarydodecyl mercaptan used in the specific examples. It is noted that with the lower boiling materials it is necessary to carry out the reaction in a pressure vessel to prevent loss of mercaptan. At the present time, it is preferred to use mercaptans having up to 16 carbon atoms in the molecule.

In the specification, "metal dust" has been used to refer to finely divided metals, the particles of which range in size from about −325 mesh (0.045–0.060 mm. diameter) to +100 and which are produced by machining, milling, shotting, granulation, atomizing, condensation, reduction, chemical precipitation, or electrodeposition, however, in general, a range of about 100 to about 200 mesh is preferred.

Although the invention has been described in connection with a batch operation, it is obvious that the process can be carried out continuously if desired, for example, by feeding the reactants and the catalyst and color inhibitor continuously to a reaction zone and providing suitable separation facilities on the outlet from the reaction zone.

The Gardner color referred to in the examples relates to the Gardner Scale which is designed specifically to measure the yellow-amber colors of oils and varnishes using eighteen standard concentrations of ferric chloride, in hermetically sealed tubes. Each color is two-thirds the intensity of the next higher color. The darkest color matches that of 3 grams of potassium dichromate in 100 ml. of sulfuric acid. The Gardner Scale is described in Physical and Chemical Examination of Paints, Varnishes, Lacquers and Colors, Gardner, H. A. and Sward, G. G., 10th Ed., Gardner Lab., Bethesda, Maryland, 1946.

Reasonable variation and modification are possible within the scope of this disclosure and the appended claims to the invention, the essence of which is a process for the preparation of organic polysulfides from mercaptans which comprises reacting a mercaptan with sulfur in the presence of a catalyst and a color inhibitor comprising a metal dust.

I claim:

1. A process for preparing an organic polysulfide which comprises reacting a mercaptan with sulfur in the presence of a catalytic amount of lime, having present in the reaction zone a finely divided metal selected from the group consisting of iron, aluminum, and zinc.

2. A process for preparing an organic polysulfide which comprises reacting a mercaptan with sulfur in the presence of a catalytic amount of phosphorus pentasulfide, having present in the reaction zone a finely divided metal selected from the group consisting of iron, aluminum, and zinc.

3. A process for preparing a dialkyl polysulfide which comprises reacting an alky mercaptan with sulfur in the presence of a catalytic amount of lime, having present in the reaction one water and a finely divided metal selected from the group consisting of iron, aluminum, and zinc.

4. A process for preparing a ditertiary alkyl polysulfide which comprises reacting a tertiary alkyl mercaptan with sulfur in the presence of a catalytic amount of lime, having present in the reaction zone water and a finely divided metal selected from the group consisting of iron, aluminum, and zinc.

5. A process for preparing ditertiarydodecyl polysulfide which comprises reacting tertiary dodecyl mercaptan with sulfur in the presence of a catalytic amount of lime, having present in the reaction zone water and a finely divided metal selected from the group consisting of aluminum, iron, and zinc.

6. A process for preparing ditertiarydodecyl polysulfide which comprises reacting tertiary dodecyl mercaptan with sulfur in the presence of a catalytic amount of phosphorus pentasulfide, having present in the reaction zone water and a finely divided metal selected from the group consisting of aluminum, iron, and zinc.

7. A process according to claim 5 in which the reaction is carried out at a temperature of about 200° F. to 300° F.

8. A process according to claim 6 in which the reaction is carried out at a temperature of about 250° F. to 350° F.

9. A process according to claim 3 in which said alkyl mercaptan contains from 1 to 16 carbon atoms.

10. A process according to claim 4 wherein said tertiary alkyl mercaptan contains from 1 to 16 carbon atoms.

11. Dialkyl polysulfides having improved color characteristics prepared by the reaction of alkyl mercaptan and sulfur in the presence of a catalyst and a color inhibitor comprising a metal dust selected from the group consisting of iron, aluminum, and zinc.

References Cited in the file of this patent

UNITED STATES PATENTS

| | | |
|---|---|---|
| 2,237,625 | Olin | Apr. 8, 1941 |
| 2,279,711 | Luten et al. | Apr. 14, 1942 |
| 2,411,236 | Thacker | Nov. 19, 1946 |
| 2,527,948 | Lyon et al. | Oct. 31, 1950 |